United States Patent [19]
Isshiki et al.

[11] 4,104,616
[45] Aug. 1, 1978

[54] HAND OPERATED OPTICAL CHARACTER RECOGNITION SYSTEM

[75] Inventors: Isao Isshiki; Koji Sato, both of Osaka, Japan

[73] Assignee: Sumitomo Electric Industries, Ltd., Osaka, Japan

[21] Appl. No.: 763,759

[22] Filed: Jan. 28, 1977

[30] Foreign Application Priority Data

| Jan. 28, 1976 | [JP] | Japan | 51-8703 |
| Feb. 17, 1976 | [JP] | Japan | 51-16823 |
| Mar. 20, 1976 | [JP] | Japan | 51-30568 |
| Mar. 20, 1976 | [JP] | Japan | 51-30569 |
| Jun. 30, 1976 | [JP] | Japan | 51-78196 |

[51] Int. Cl.² .............................. G06K 9/12
[52] U.S. Cl. ..................... 340/146.3 Y; 340/146.3 J
[58] Field of Search ............... 340/146.3 J, 146.3 SY, 340/146.3 MA; 146.3 AC, 146.3 H, 146.3 Y

[56] References Cited

U.S. PATENT DOCUMENTS

| 3,165,718 | 1/1965 | Fleisher | 340/146.3 Y |
| 3,328,761 | 6/1967 | Yamamoto et al. | 340/146.3 Y |
| 3,403,378 | 9/1968 | Narita et al. | 340/146.3 Y |
| 3,634,823 | 1/1972 | Dietrich et al. | 340/146.3 Y |
| 3,710,319 | 1/1973 | Miller et al. | 340/146.3 J |
| 3,947,817 | 3/1976 | Requa | 340/146.3 MA |

*Primary Examiner*—Leo H. Boudreau
*Attorney, Agent, or Firm*—Sughrue, Rothwell, Mion, Zinn and Macpeak

[57] ABSTRACT

A hand operated optical character recognition system utilizes a one dimensional array of photo-sensitive elements divided into a plurality of groups, each group having at least one photo-sensitive element and defining a unit region to be scanned on a sheet bearing at least one row of characters to be recognized. The array is vertically scanned while being horizontally moved across the sheet. The number of outputs from the unit regions occupied by a character in each vertical scan and the number of vertical scans performed for the character in one horizontal scan are counted to enable the character recognition.

35 Claims, 23 Drawing Figures

| HBi | MEANING |
|---|---|
| 0 | NO CHARACTER SEGMENT |
| 1 | ONE VERTICAL SEGMENT |
| 2~5 | TWO VERTICAL SEGMENTS OR A SHORT HORIZONTAL SEGMENT |
| 6, 7 | LONG HORIZONTAL SEGMENT |

| HPi | MEANING (POSITION OF SEGMENT) |
|---|---|
| 0~2 | REAR |
| 3~5 | CENTER |
| 6, 7 | FRONT |

|  | PARTIAL FEATURE | NOTES |
|---|---|---|
| C0 | BLANK | NO SEGMENT |
| C1 | ⌒I | ONE VERTICAL SEGMENT IN REAR PORTION |
| C2 | O I O | ONE VERTICAL SEGMENT IN CENTER PORTION |
| C3 | I ⌒ | ONE VERTICAL SEGMENT IN FRONT PORTION |
| C4 | O I I , _ O _ | TOW VERTICAL SEGMENTS IN CENTER AND REAR PORTION OR ONE SHORT HORIZONTAL SEGMENT EXTENDING FROM CENTER TO REAR |
| C5 | I I O , I O I , | TOW VERTICAL SEGMENTS IN FRONT AND CENTER OR FRONT AND CENTER |
| | — O | A SHORT HORIZONTAL SEGMENT COVERING FRONT AND CENTER |
| C6 | — | LONG VERTICAL SEGMENT |

HAND OPERATED OPTICAL CHARACTER RECOGNITION SYSTEM

BACKGROUND OF THE INVENTION

1. Field of the Invention

The present invention relates to an optical character recognition system for identifying characters printed, typed or handwritten on a sheet or card, which utilizes a one dimensional array of photo-sensitive elements and allows manual scanning of the data characters by means of a hand-held sensing device.

2. Description of the Prior Art

Heretofore, readout devices for typed or handwritten characters have usually utilized a complicated and costly scanning apparatus involving a flying spot scanning tube and/or a large number of register stages. Such systems typically employ a pattern matching technique for character recognition. Therefore, when an electrical character pattern obtained by converting a scanned character into corresponding electrical signals and storing them in a shift register is skewed or deviated in a lateral or vertical direction, or the respective adjacent character patterns are irregularly enlarged or reduced in a vertical or lateral direction, from their standard positions, then character recognition becomes impossible. Before such recognition, it has thus been necessary to perform a complicated preprocessing treatment to render the character inclination, size, and position as close to standard criteria as possible.

Even with such preprocessing treatment, character recognition is still impossible when the vertical tilt of the character and/or the horizontal scanning speed is beyond a certain tolerance level. For these reasons, a complicated scanning process using a flying-spot scanner and a precise sheet feeding mechanism such as a tag feeding mechanism to stabilize the feeding speed and direction has been required, resulting in a very expensive readout system.

In order to improve such defects of conventional systems a manual type of character recognition system has been developed, as disclosed in U.S. Pat. No. 3,947,817. Such system uses two dimensional arrays of photosensitive elements incorporated in a hand-held scanning device for scanning a data character printed on, for example, a tag. This system still involves a matrix of photosensitive elements, however, and performs a pattern-to-pattern comparison, whereby the processing hardware associated with the scanning device is relatively complicated and expensive.

SUMMARY OF THE INVENTION

The present invention is intended to overcome the drawbacks of the prior art, including those of the above patent, by providing an inexpensive character recognition system which enables a character to be read out even when the horizontal scanning speed is widely varied and/or the scanned character is heavily vertically tilted.

The invention is characterized in that a scanned character is identified by obtaining and normalizing the occurrence frequency distribution of the character segments projected onto the vertical axis of a pattern read out each time the vertical scan is completed, and by obtaining the position distribution of the character segments in the vertical direction.

A printed or handwritten character on a tag is first vertically scanned by a one dimensional array of photoelectric elements mounted on a sensor and is then horizontally scanned as the sensor is laterally moved across the tag, and the sensor output is sampled at a constant sampling rate. In the following description, the photoelectric elements will sometimes be referred to as "cells", and the minimum region on the tag to be scanned, which defines the resolution required for character recognition, will be referred to as a "unit region". A unit region may be scanned by only one cell, and therefore each cell or group of cells will sometimes also be referred to as a "unit region".

A train of signals sampled in each vertical scan for a character to be read out is used to count the number of character segments existing in each of the vertically addressed unit regions, and the number of vertical scans performed for each unit region is also counted, the latter count being started at the instant when a first character segment is detected with respect to each unit region. The ratios of the former number of counts for each of the vertically addressed unit regions and the maximum number of counts for all the unit regions and those of the latter number of counts for each of the unit regions and the maximum number of counts for all the unit regions are respectively divided into a plurality of normalized values. Thus, the character recognition may be performed on the basis of the order of the normalized values arranged in the vertical direction.

The character recognition system according to the present invention has the advantage that it can identify a scanned character regardless of variations in the horizontal scanning speed and/or the skew of the scanner array with respect to the character.

Figures 1, 2:
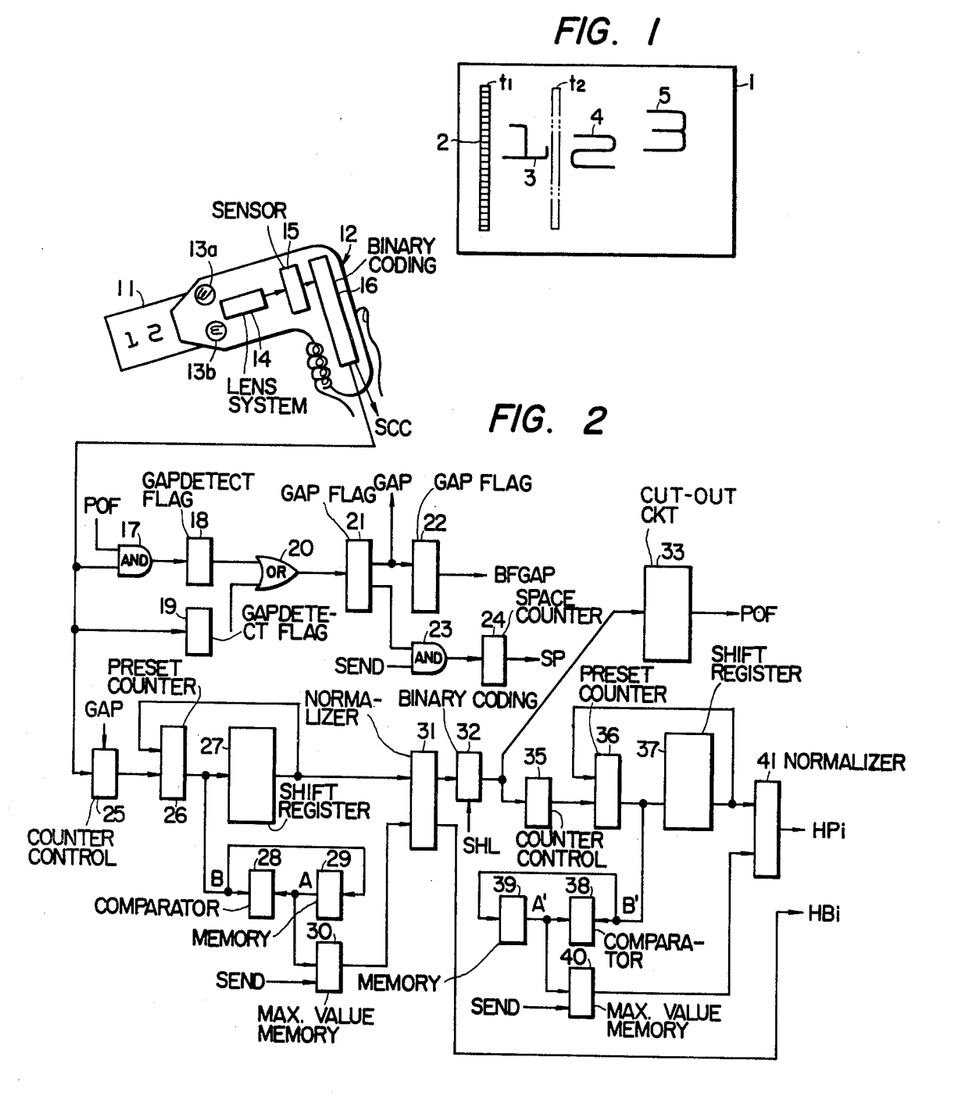
FIG. 1 shows a character bearing tag with a one dimensional scanning array of photo-sensitive elements super-imposed thereon.
FIGS. 2 and 6 show a block diagram of an embodiment of the present invention.

The present invention is further intended to provide a system for effectively picking up characters from a poor background. FIG. 1 shows an example of a tag 1 on which numerals (hereinafter referred to as "characters") "1", "2", and "3" to be read out are printed, and which contains stains or dirty spots 4, 5 around the numerals. The dirty spots may cause an erroneous readout to occur, and should be excluded from the sensor field 2. In the past, such spots have been excluded by adjusting the readout level, providing a special filter in front of the sensor, or appropriately treating the signals corresponding to the spots after readout — together with the true character signals. The former two methods of exclusion are not reliable, and the last method requires a large computer program capacity and processing time. Further, when the vertical positions of the numerals are irregular and/or when the scanner is manipulated by hand, there is strong possibility of the characters leaving the sensor field 2 and causing an erroneous recognition.

The above problems are solved by the present invention in which, after every vertical scan is completed, the analog scanning signals obtained are directly processed. For this purpose, the analog scanning signals are converted into binary form, the character components or segments and the remaining background being represented by binary coded signals "1" and "0", respectively. In the past, the binary conversion of the analog signals included a threshold comparison of each analog signal with a reference level. In such a conversion method, it is difficult to compensate for analog character signal variations due to variations in the reflectivity of the tag, the amount of light incident on the tag and/or the distance between the sensor and the tag, particularly when the sensor is manually handled. The binary coding system of the present invention is intended to avoid the above mentioned disadvantages.

DETAILED DESCRIPTION OF THE PREFERRED EMBODIMENTS

FIG. 2 shows an embodiment of the present invention in which a tag 11 is scanned by moving a hand-held scanner 12 in a lateral direction. The scanner 12 includes a pair of lamps 13a and 13b which illuminate the tag surface via a suitable optical system, and a sensor 15 comprising a plurality of one dimensionally arranged photocells which receive the lamp light reflected from the tag 11 through a suitable lens system 14. Since the reflections from the background area of the tag and those from the character on the tag are different, the corresponding signal levels obtained from the respective photocells are readily distinguishable. The scanner 12 further includes a binary coding circuit 16 which receives the signals from the photocells and classifies them into black signals and white signals, which may be represented as binary "1" and "0", respectively.

Figures 3, 4:
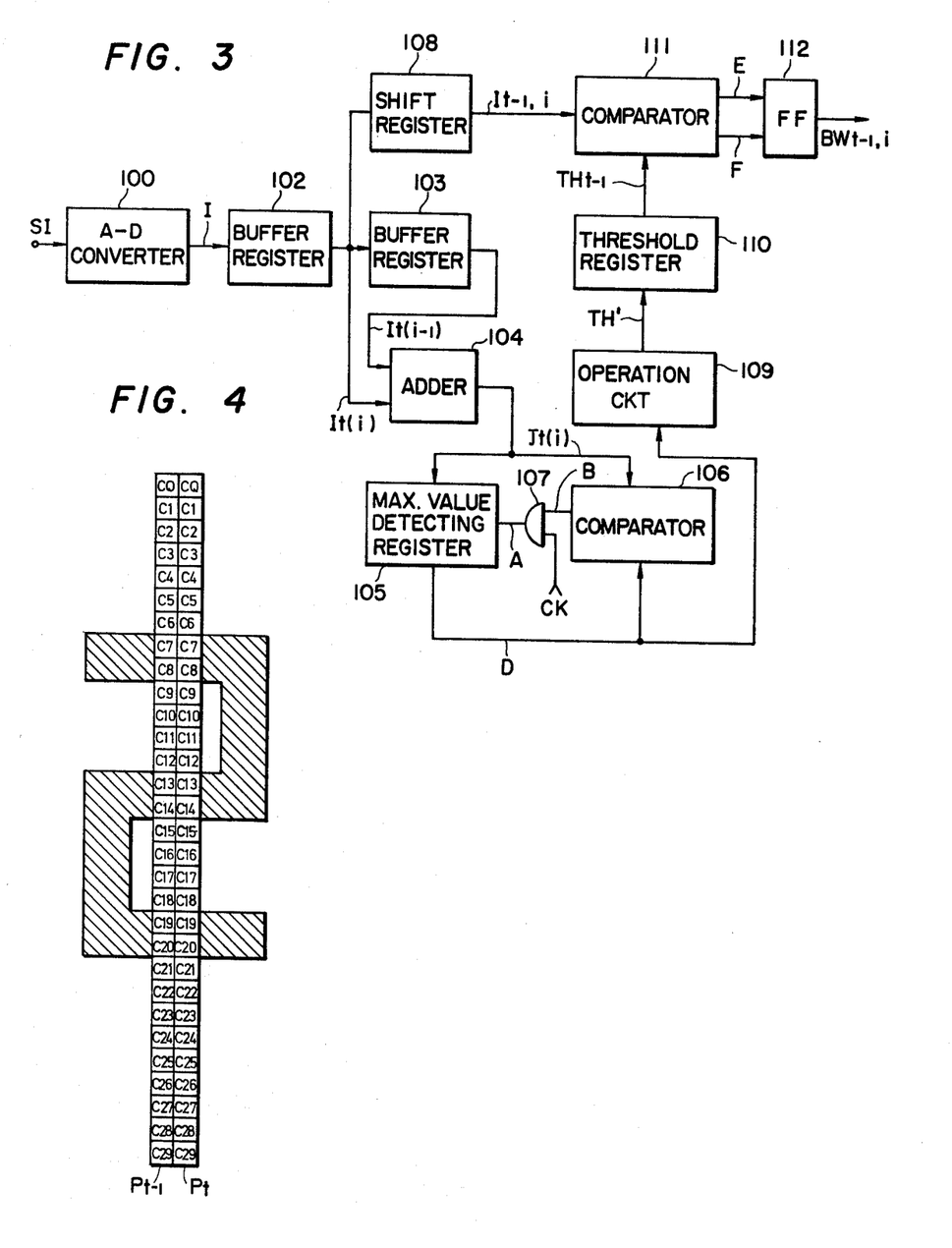
FIG. 3 shows a block diagram of a binary coding circuit for the output of the photo-sensor.
FIG. 4 shows the relationship between the character pattern on a tag and the photo-sensor in FIG. 2.

FIG. 3 shows an embodiment of the binary coding circuit 16, which includes an A-D converter 100 for receiving an analog output signal SI from the sensor 15 and converting it into a digital signal I, and a pair of buffer registers 102 and 103 for storing the output signal I from the A-D converter 100. The register 102 stores the preceding output signal $I_t(i)$ of the converter 100, and the register 103 stores the next preceding output signal $I_t(i-1)$. An adder 104 provides a sum of the contents $I_t(i)$ and $I_t(i-1)$ of the buffer registers 102 and 103 as an output signal $J_t(i)$. A maximum value detecting register 105 stores the $J_t(i)$ signal in response to an output signal A from AND circuit 107, and holds such signal until the next signal A is applied thereto. A comparator 106 compares the current $J_t(i)$ signal with the output D of the register 105, and provides an output B when $J_t(i) > D$. The AND circuit 107 is supplied with the output signal B of the comparator 106 and a timing or clock signal CK produced every time each of cells C0 to C29 (FIG. 4) is scanned, and generates an output signal A in response to the presence of both inputs. The maximum value of $J_t(i)$ is obtained by the operation of the register 105, the comparator 106 and the clocked AND circuit 107, and it is stored in the register 105. By operating these components in such a manner that the register 105 is cleared after each vertical scan, according to a timing sequence described below, the content of the register 105 at the completion of each vertical scan indicates the maximum value of $J_t(i)$ obtained during the scan.

A shift register 108 has a capacity sufficient to store the A-D converted signals $I_t$ obtained when any of the characters on the tag 11 to be read out are scanned, and receives the original output $I_t(i)$ of the buffer register 102 every time a newly converted signal I is supplied to the register 102. Therefore, the output signal of the shift register 108 just before receiving the signal $I_t(i)$ for a current vertical scan line is the signal $I_{(t-1)(i)}$ of the preceding scan line. When the shift register 108 receives $I_t(i)$, it provides an output of $I_{(t-1)(i+1)}$. A circuit 109 provides a threshold value output TH' from the maximum value signal D of the register 105, according to the following formula:

$$TH' = \frac{D - aD + b}{2},$$

where a and b are constants.

A threshold value register 110 stores the output signal TH' according to a timing sequence described below, and holds such value. A comparator 111 compares the output signal $TH_{t-1}$ of the register 110 with the output signal $I_{(t-1)(i)}$ of the register 108, and provides a logic "1" output signal E when $TH_{t-1} > I_{(t-1)(i)}$. When $TH_{t-1} < I_{(t-1)(i)}$, the comparator output signal F is raised, or at a logic "1" level. When $TH_{(t-1)} = I_{(t-1)(i)}$, the output signals E and F of the comparator become logic "0". A black-white flip-flop 112 is set when the output signal E is "1" and reset when the output signal F is "1", to thus provide a binary coding determination signal $BW_{(t-1)(i)}$. When the outputs E and F of the comparator 111 are both "0", the result $BW_{(t-1)(i-1)}$ of the preceding determination is maintained as $BW_{(t-1)(i)}$.

The operation of various portions of the circuit in FIG. 3 will be described with reference to FIGS. 4 and 5.

As shown in FIG. 4, an analog output signal of the respective photo-cells is obtained by focusing a character or symbol pattern on the photo-electric conversion device and sequentially scanning the output signals of the respective photo-cells C0, C1, C2 . . . C29, and the analog output is shown in FIG. 5 as SI.

Figure 5:
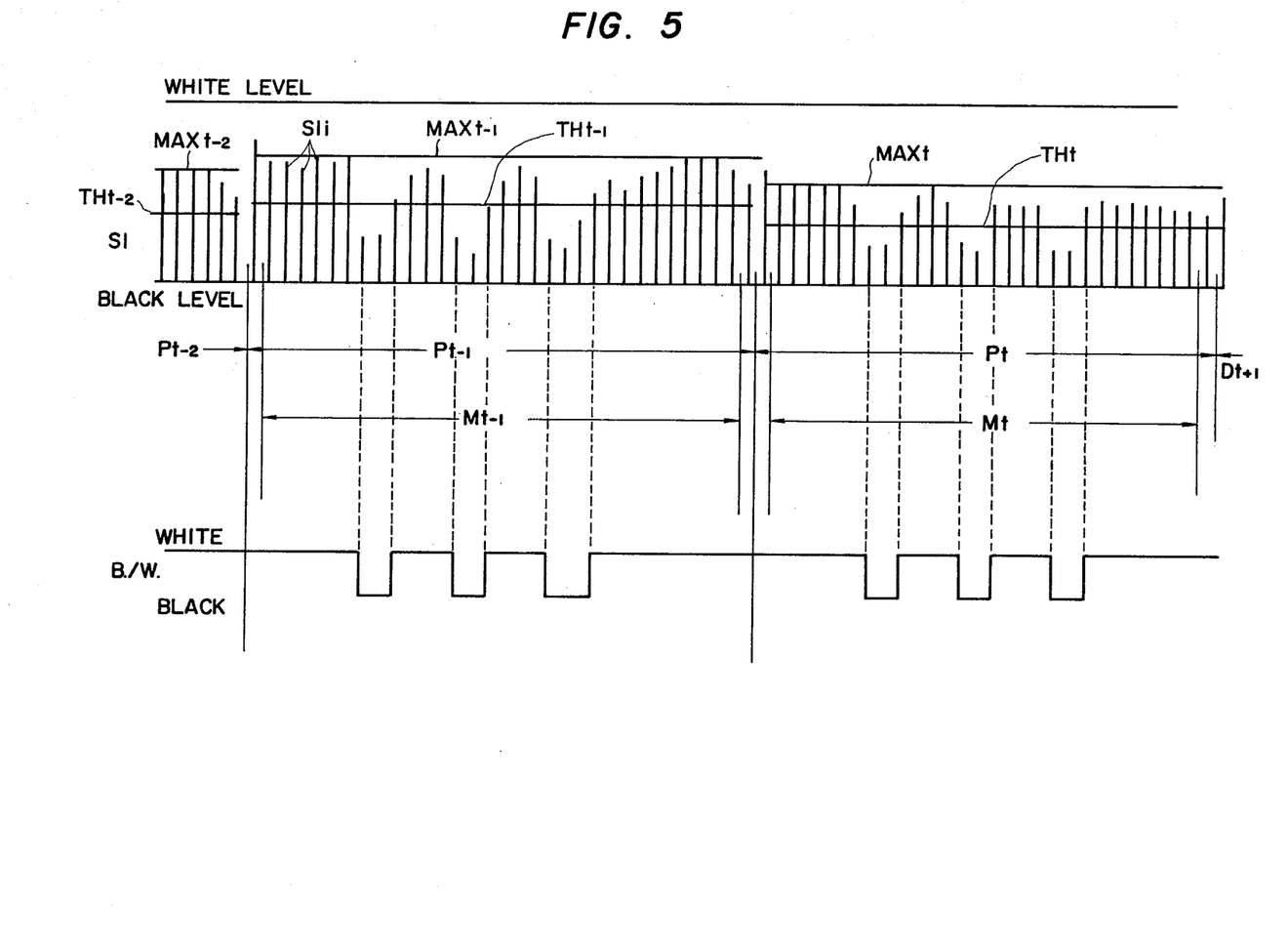
FIG. 5 shows a timing diagram obtained by scanning the tag shown in FIG. 1, FIGS. 7(a) and 7(b) show a normalized black and white scanning pattern.

The signals appearing in time frame $Pt-1$ in FIG. 5 represent the output signals of the cells Ci when the sensing array is at position Pt−1 of the character image in FIG. 4, and the signals appearing in time frame Pt represent the output signals of the cells when the array is at position Pt in FIG. 4. The signal levels SI at position Pt−1 and position Pt are seen to substantially vary, which could be due to changing character contrast, scanner tilting, etc.

Just before the commencement of the vertical scan Pt, the buffer register 102 stores the value obtained by digitizing the output signal of the last cell C29 during the preceding vertical scan $P_{(t-1)}$, and the buffer register 103 stores the value obtained by digitizing the output signal of cell C28. Further, the shift register 108 stores the output signals from all of the cells in the $P_{t-1}$ vertical scan, and the output signal of the register 108 corresponds to the output from the upper most cell C0 in the $P_{t-1}$ vertical scan. The register 110 stores the threshold value $TH_{t-1}$ which is the maximum sum of the outputs of two successive cells appearing in a time frame $M_{(t-1)}$ in the $P_{t-1}$ vertical scan, the two cells being selected from cells C1 to C28.

With the components in such status, the $P_t$ vertical scan proceeds as follows:

(1) The black-white flip-flop 112 is reset (initiating the whole operation).

(2) Flip-flop 112 is set, cleared, or held according to the output signals E, F of the comparator 111 (binary coding of $I_{(t-1)(0)}$).

(3) The output signal of cell C0 is scanned and, after digitizing by A-D converter 100, stored in the buffer register 102, the preceding content of which is simultaneously transferred to the buffer register 103.

(4) The content (output siganl of C0) of the buffer register 102 is entered in the shift register 108, the output of which becomes the output signal $I_{(t-1)(1)}$ of cell C1 during the $P_{t-1}$ vertical scan.

(5) The content D of the maximum value register 105 and the sum $J_{t(0)}$ of the contents of the buffer registers 102 and 103 are compared by the comparator 106, and if $J_{t(0)} > D$ then $J_{t(0)}$ is stored in the register 105.

(6) The black-white flip-flop 112 is set, cleared, or held according to the output signal E and F of the comparator 111. (Binary coding of $I_{(t-1)(1)}$).

(7) The output signal of cell C1 is scanned and, after digitizing by A-D converter 100, stored in the buffer register 102, the preceding content of which is simultaneously transferred to the buffer register 103.

(8) The content (output signal $I_{t(1)}$ of cell C1) of the buffer register 102 is entered in the shift register 108, the output of which becomes the output signal $I_{(t-1)(2)}$ of cell C2 during the $P_{t-1}$ vertical scan.

(9) The maximum value register 105 is cleared.

(10) The black-white flip-flop 112 is set, cleared, or held according to the output signals E and F of the comparator 111. (binary coding of $I_{(t-1)(2)}$).

(11) The output of the next cell Ci is scanned and, after digitizing by A-D converter 100 to obtain $I_{t(i)}$, stored in the buffer register 102, the preceding content of which ($I_{t(i-1)}$) is simultaneously transferred to the buffer register 103.

(12) The content $I_{t(i)}$ of the buffer register 102 is written in the shift register 108, the output of which becomes $I_{(t-1)(i+1)}$.

(13) The content D of the maximum value register 105 is compared with $J_{t(i)} = I_{t(i-1)} + I_{t(i)}$, and if $J_{t(i)} > D$ then $J_{t(i)}$ is stored in the register 105 under control of the clock pulse CK. If $J_{t(i)} < D$, the register 105 is left intact.

(14) Operations (10) − (14) are repeated until the scanning of cell C28 is completed.

(15) The black-white flip-flop 112 is set, cleared, or held according to the output signals E and F of the comparator 111 (binary coding of $I_{(t-1)(29)}$).

(16) the output signal of cell C29 is scanned and, after being digitized by A-D converter 100 to $I_{t(29)}$, stored in the buffer register 102, the preceding content of which $I_{t(28)}$ is simultaneously transferred to the buffer register 103.

(17) The content $I_{t(29)}$ of the buffer register 102 is entered in the shift register 108, the output of which becomes $I_{t(0)}$.

(18) The threshold value TH′ is obtained from the content D of the maximum value register 105 on the basis of $$TH' = \frac{D - aD + b}{2},$$

and stored in the threshold register 110.

Upon the completion of the above operations, the binary coding of the analog signal obtained in one vertical scan is accomplished. By repeatedly and sequentially performing the operations (1) − (18) above in accordance with the circuit shown in FIG. 3, it is thus possible to quantize the entire analog character signal into a binary signal.

As will be clear from the foregoing, the binary coding circuit of the present invention obtains $J_{t(i)}$ by adding the signals from two successive cells of the scanning array other than the upper most and the lower most cells C0 and C29 during one vertical scan, obtains the maximum value $MAX_i$ of $J_{t(i)}$ (see FIG. 5), obtains the threshold value $$TH_i (= \frac{MAX_i - a\, MAX_i + b}{2})$$

from the maximum value $MAX_i$, and compares $TH_i$ with the respective outputs $I_{t(0)}, I_{t(1)}, I_{t(2)} \ldots I_{t(29)}$ of the cells C0, C1, C2 . . . C29 to thereby obtain the binary coded signals.

As described above, by storing all of the data obtained in one vertical scan, obtaining the maximum value thereof, and binary-coding the former data by comparing it with the latter maximum value, it becomes possible to absorb variations in the incident light level due to dirts or stains on the tag 11, variations in the intensity of the light source, etc., and to convert the original analog character or symbol pattern into a binary coded signal pattern with a high degree of fidelity.

The reason why the output signals from two successive cells are used to obtain the maximum value of $J_{t(i)}$ is that, if a two phase clock signal is used for deriving the video signals through the scanning of image sensor cells, a noise component due to the clock signal is introduced into the video signal. By obtaining the maximum value by adding the video signals, the number of which corresponds to the number of phases of the clock, the effect of such noise can be reduced. This is particularly effective where an IC image sensor is used as the photoelectric conversion device. Further, the reason why the outputs of the upper most and the lower most cells are excluded from the determination precedure of the maximum value signal is that the reliability of these signals is relatively low. In an IC image sensor, for example, the conditions within the photo-electric conversion device adversely affect the opposite end cells.

In the above description, the formula:

$$TH = \frac{MAX - aMAX + b}{2}$$

is utilized. The denominator "2" corresponds to the number of cells used to obtain the threshold value TH. Therefore, with a four-phase clock wherein the maximum value of MAX is calculated by using four successive cells, the denominator becomes 4. Further, instead of the maximum value, it may be possible to obtain the minimum value by inverting the black and white levels.

Returning to FIG. 2, when the counter control circuit 25 receives sequential signals corresponding to the respective unit regions from the control and binary coding circuit 16, it presets the preset counter 26 with the output of the shift register 27. Thus, when the received signal is black or binary "1" corresponding to a segment of a character to be recognized, then one is added to the content of the preset counter 26 and the added value is stored in the shift register 27. When, on the other hand, the received signal is white or binary "0", then the content itself of the preset counter 26 is written in the shift register 27. Further, when the counter control circuit 25 is supplied with a signal GAP representative of termination of any one character scan on the tag 11 from a gap flag 21, it clears the preset counter 26, adds one to the content of the preset counter 26 when the signal from the circuit 16 is binary "1" and stores the added value in the shift register 27. When, on the other hand, the signal from the circuit 16 is binary "0", the content itself of the preset counter 26 is stored in the shift register 27. Hence, the shift register 27 has a memory capacity sufficient to store the greatest possible number of binary coded signals "1" for each of the vertically addressed cells C0 to C29 on the tag 11 obtained when each of the characters thereon is scanned by the scanner 12. In the specific embodiment disclosed, the memory capacity of the shift register 27 comprises 30 stages (column) equal in number to the vertically addressed cells C0 to C29 and 4 to 8 cascaded stages (row) sufficient to count the number of vertical scans by the scanner 12 required for each character recognition. Thus, the register 27 operates to count the number of black or binary "1" signals for each of the unit regions which correspond to the cell C0 to C29 under control of the clock pulse signals CK produced every time each of the unit regions is scanned in the vertical direction. Accordingly, the content of the shift register 27 represents the number of character segments in the horizontal direction for each of the vertically addressed unit regions.

When the content of the preset counter 26 is stored in the register 27, it is also fed to a comparator 28. The latter compares the content A of a memory 29 with the content B applied from the preset counter 26, and if B>A, the content B is stored in the memory 29.

Each time one vertical scan is completed, the content of the memory 29 is written in a maximum value memory 30 under control of a SEND signal derived from the control and coding circuit 16 for each termination of a vertical scan, and then it is cleared. That is, the maximum value memory 30 operates to store the maximum number of black or binary "1" signals for each of the vertically addressed unit regions which has been stored in the shift register 27.

A normalizer 31 operates to provide ratios between the contents of the shift register 27 and the maximum value memory 30 for each of the vertically addressed unit regions, and divide them into a plurality of normalized values.

There is a possibility of a large variation in the horizontal scanning speed and/or a skew of the scanner with respect to the tag because the scanner is hand-held and moved by hand. In the present invention, however, since the number of black or binary "1" signals for each of the vertically addressed unit regions is normalized by comparing it with the maximum number of black or binary "1" signals for all the unit regions, the normalized value is not substantially affected even when the horizontal scanning speed and/or the scanning angle or tilt of the scanner relative to the tag is somewhat changed.

The normalized and divided output of the normalizer 31 for each of the vertically addressed cells C0 to C29 is fed to a binary coding circuit 32, which compares the normalized data with a constant threshold level SHL, and classifies the pattern information projected on the vertical axis into two values corresponding to the background region and the character region on the tag 1.

Figure 8:
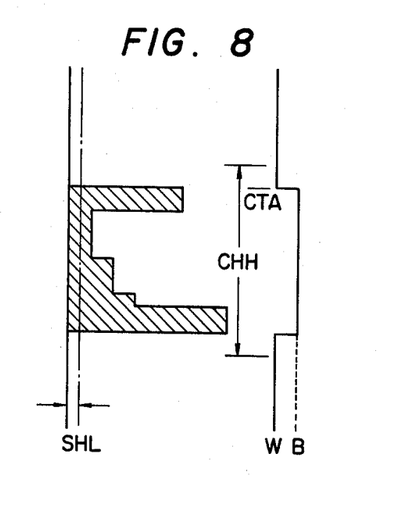
FIG. 8 shows a character segment occurrence frequency distribution.

FIG. 8 shows the normalized data and the binary coded data when, for example, the sensor field 2 is moved from a position $t_1$ to a position $t_2$ on the tag 1 shown in FIG. 1. The character region and the background region after the binary-coding are represented as B(black) and W(white), respectively. A cut-out circuit 33 detects an address number CTA representative of the upper most unit region of the scanned character on the basis of the coded data, decides the coverage (hereinafter referred to as "character region")CHH occupied by the character, and provides an output signal POF as hereinafter described. The B and W outputs of the coding circuit 32 represent the presence and the absence of a character segment, respectively.

A counter control circuit 35 is sequentially fed with binary coded signals corresponding to the respective unit regions from the binary coding circuit 32 and functions in the same manner as the counter control circuit 25. Thus, a preset counter 36, a shift register 37, a comparator 38, a memory 39 and a maximum value memory 40 operate in the same manner as the preset counter 26, the shift register 27, the comparator 28, the memory 29, and the maximum value memory 30, respectively. That is, the maximum value memory 40 operates to store that maximum value of vertical scans for each of the vertically addressed unit regions, starting at the time when a first black signal therefor is detected which is memorized in the shift register 37. In other words, the shift register 37 operates to count the number of vertical scans for each of the vertically addressed unit regions starting upon detection of a first segment of a character to be recognized and to detect an address corresponding to a first character segment for each of the vertically addressed unit regions, whereby the content of the shift register 37 represents the shape of the front of the character.

A normalizer 41 operates to calculate a ratio of the content of the shift register 37 to the content of the maximum value memory 40, and divide it into a plurality of normalized values to produce a signal HPi.

The termination of a scanning operation required for any one character on the tag 11 to be read out is detected as follows:

Gap detection flags 18 and 19 are each set by a SEND signal produced after termination of each of the vertical scans. The gap flag 18 comprises a flip-flop circuit which is cleared when a black signal representative of a character segment is detected during the generation period of the vertical character cut-out signal POF, and the flag 19 comprises a flip-flop circuit which is cleared when a black signal representative of a character segment is detected during one vertical scan period. After one vertical scan is completed and just before the SEND signal is produced, the output signals of the gap detection flags 18 and 19 are fed to an OR circuit 20 at the timing of the clock CK1, and the output of OR circuit 20 is stored in the gap flag 21, whose content is transferred to a gap flag 22. That is, the gap flag 21 is set when a character segment is not detected during the vertical character cut-out period POF, or when no character segment is detected during one vertical scan, and the gap flag 22 stores the content of the gap flag 21 for the preceding vertical scan. The output signal GAP of the gap flag 21 is supplied to the counter control circuit 25, and ANDed by an AND gate 23 with the SEND signal to add one to the content of a space counter 24. When the content of the counter 24 reaches or exceeds a predetermined value it indicates that one character line scan has been terminated and produces a space signal SP, thereby to reset the circuits. The space counter 24 is cleared when a black signal representative of a character segment is detected. The gap flag 22 provides an output signal BFGAP and stores the signal GAP. When the signal BFGAP is binary "0" and the signal GAP is binary "1", it indicates that one character scan has been completed, and the recognition of that character is then performed.

Assuming that, in FIG. 1, when the sensor field 2 is shifted to position $t_2$ a character region such as shown in FIG. 8 is cutout, the gap detection flags 19 and 18 are binary "0" and binary "1", respectively, and the gap flag 21 is set at binary "1". Since the gap flag 21 is binary "0" when the sensor array is in a position just before the position $t_2$, the GAP and BFGAP signals respectively become binary "1" and binary "0" at the position $t_2$ to thereby indicate the completion of one character scan, and on the basis of these signals, recognition for the scanned character is then performed.

Figure 6:
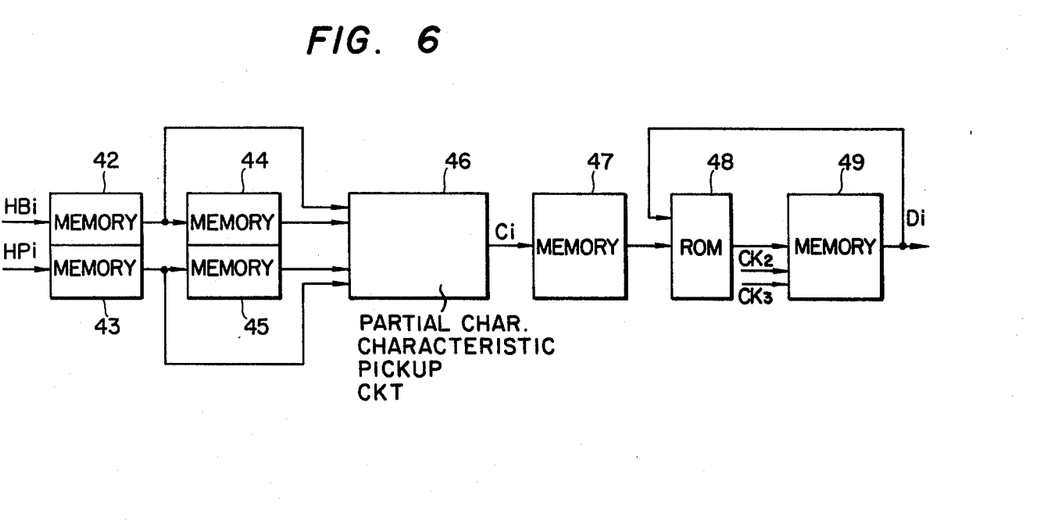

Upon the completion of one character scan, the outputs HB$i$ and HP$i$ from the normalizers 31 and 41 are supplied to memories 42 and 43 shown in FIG. 6 and the contents of these memories are sent to memories 44 and 45, respectively.

A characteristic pickup circuit 46 operates to derive, from the contents of the memories 42 to 45, a plurality of partial character characteristics for each of the vertically addressed unit regions or for the combination of the several adjacent ones thereof and to produce a partial character characteristic signal C$i$.

Figure 7A:
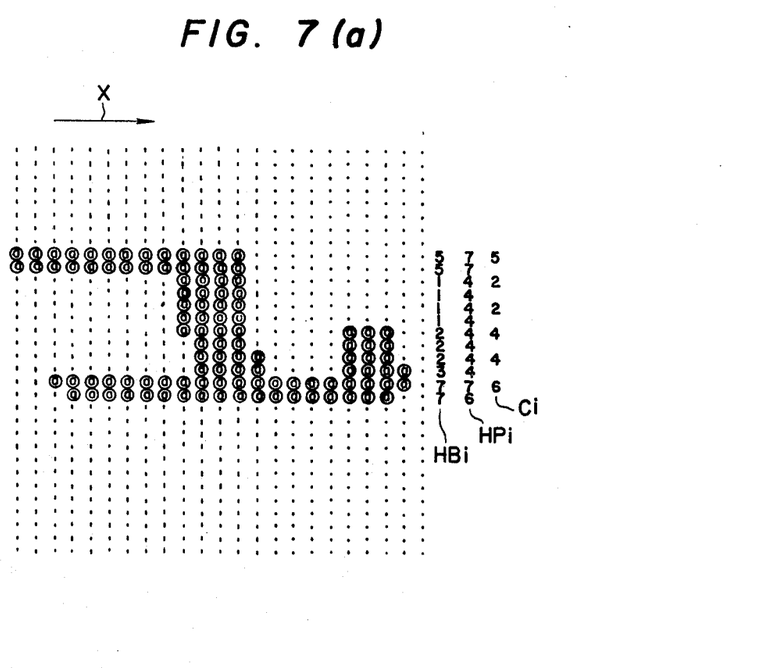
Figure 9:
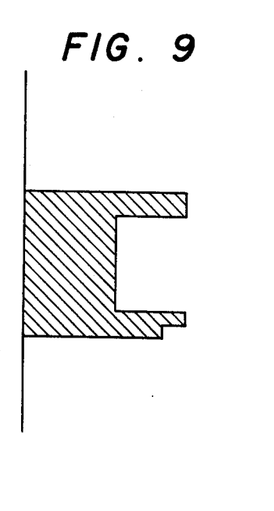
FIG. 9 shows the front shape of a character.

FIG. 7a shows, for example, the normalized values HB$i$ and HP$i$ respectively obtained as mentioned and corresponding to the number of character segments for each of the vertically addressed unit regions and the number of vertical scans starting at the time when a first character segment therefor is detected, when the numeral "1" of an OCR-A font is scanned from left to right, and FIGS. 8 and 9 show these patterns when the normalized values HB$i$ and HP$i$ are projected on the vertical axis, respectively.

Figure 7B:
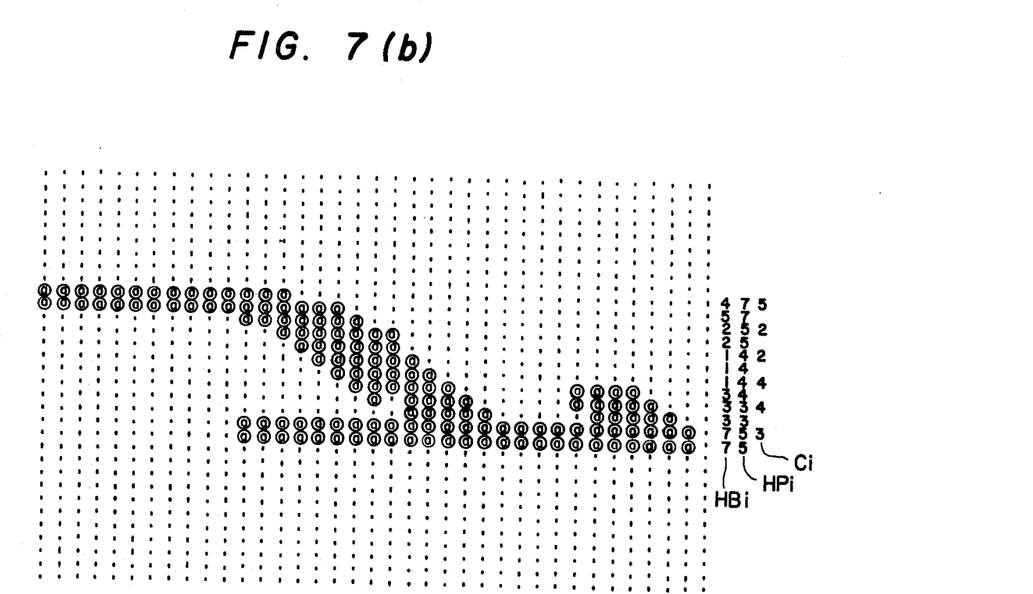
Figure 7C:
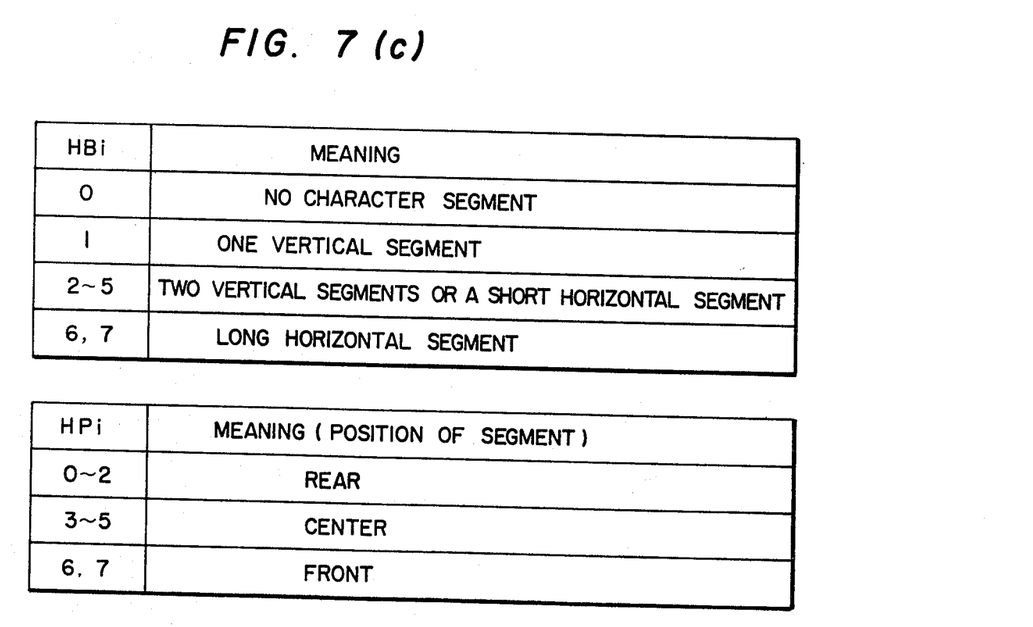
FIG. 7(c) shows an occurrence frequency interpretation table.

In FIG. 7a, the arrow X shows the scanning direction and "a" and "." show the black and white pattern data obtained by the scanning, respectively. In this case, it is assumed that the normalized values HB$i$ and HP$i$ are distinguished from one another by eight numerals from 0 to 7 and represented by the ratios relative to their individual maximum values 7 for each of the vertically addressed unit regions, respectively. A larger number for the normalized value HB$i$ represents that a larger number of character segments is detected for each of the vertically addressed unit regions and for the normalized value HP$i$ represents that a first character segment for each of the vertically addressed unit regions is detected at a more front position. FIG. 7c shows a table for interpreting the various HB$i$ and HP$i$ numbers.

Figure 10:
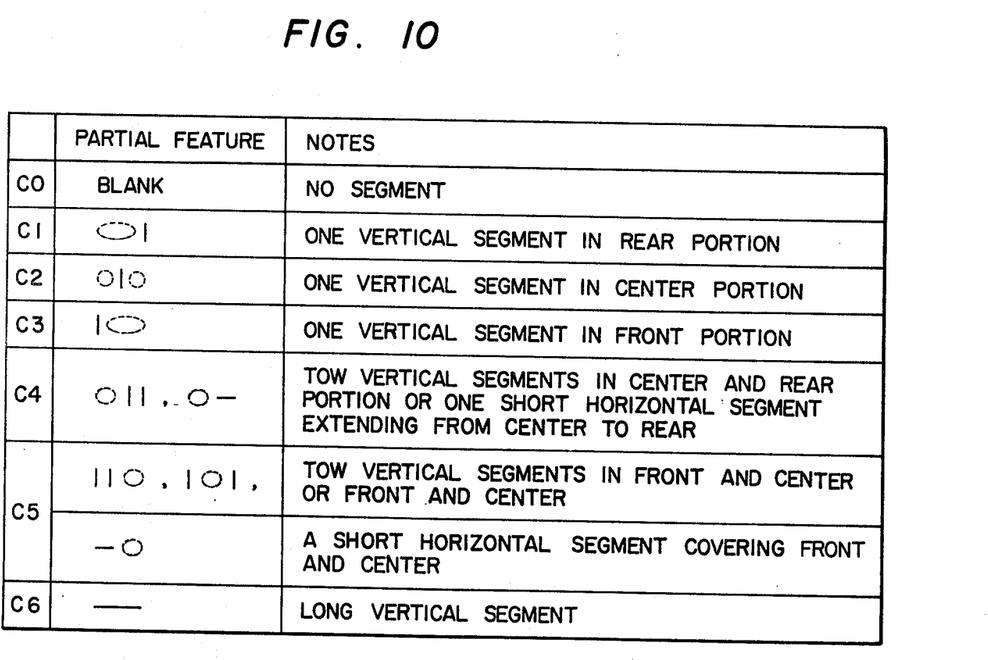
FIG. 10 shows an explanatory table of a partial feature classification.

The pickup circuit 46 combines, for example, two adjacent unit regions and divides them into seven characteristics C0-C6, as shown in FIG. 10, signals representative of the characteristics C0-C6 being stored in a memory 47.

The recognition is performed by a recognition sequence circuit comprising a read only memory 48 which is sequentially supplied with the content of the memory 47, and a memory 49 which is sequentially written with the content read out from the ROM 48 under control of a clock pulse signal CK2. The address signal for the ROM 48 is composed of the partial character characteristic signal C$i$ and the output D$i$ of the memory 49, which is renewed to the hereinunder described content $D_0$ under control of a clock signal CK3 when the now scanned character is recognized and a signal representative of the recognition result is produced therefrom. For example, assuming that the data and the normalized values HB$i$ and HP$i$ as shown in FIG. 7a are obtained, the partial character characteristic signals C$i$ change successively in the order of C5, C2, C2, C4, C4 and C6, according to the interpretation table shown in FIG. 10.

Figure 11:
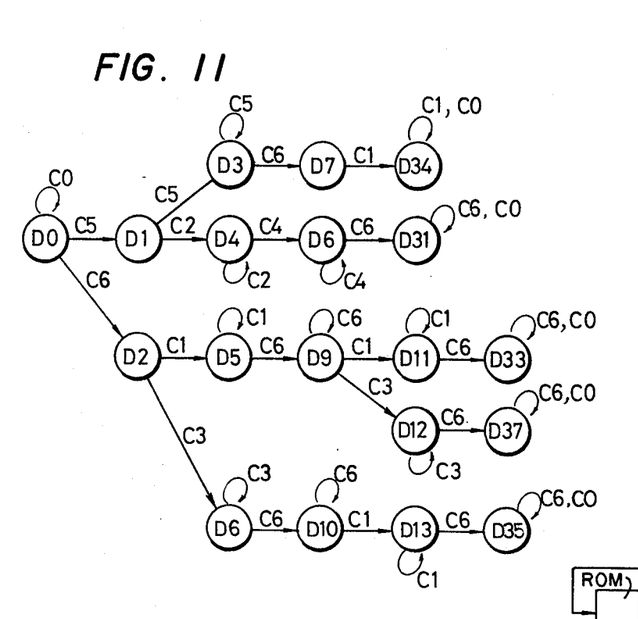
FIG. 11 shows a flow chart of the operation of the recognition portion of the present system.

FIG. 11 shows a part of a practical logic flow diagram for the recognition sequence circuit composed of the ROM 48 and the memory 49. In FIG. 11, the outputs D$i$ of the memory 49 change successively in the order of D0, D1, D4, D6 and D31 with respect to the numeral "1". D31 to D35 correspond to numerals "1" to "5", respectively, and thus such recognition corresponds to the numeral "1".

According to the present invention since the number of black signals detected for each of the vertically addressed unit regions and the number of vertical scans starting at the time at which a first black signal therefor is detected are compared with their maximum values to normalize them, it is possible to recognize any character even when the horizontal scanning speed of the scanner varies and/or the sensor cell array is somewhat skewed relative to the character to be recognized. For example, according to the present invention, the character can be recognized in the same manner as in FIG. 7a even when the black-white data pattern is badly skewed as shown in FIG. 7b.

Further, a constant value smaller than the minimum number of vertical scans for any character at a predetermined maximum horizontal scanning speed may be established, so that when one character scanning period is terminated with a smaller number of vertical scans than the constant value, the scanning data thus obtained may be processed as noise by the output HB$i$ of the normalizer 31, whereby no character recognition is performed.

Figure 12:
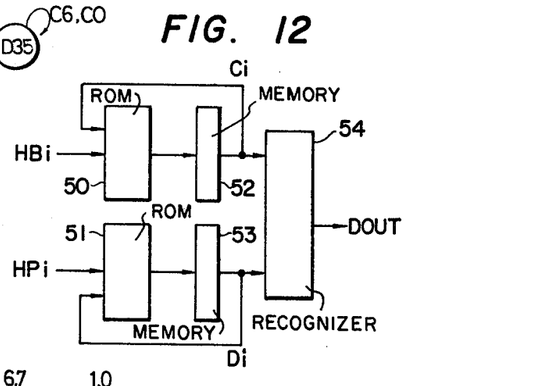
FIG. 12 shows another embodiment of the recognition sequence circuit.

FIG. 12 shows another embodiment of the recognition sequence circuit for processing the signals HB$i$ and HP$i$ normalized by the normalizers 31 and 41. In FIG. 12, Read Only Memories 50 and 51 are supplied with the signals HB$i$ and HP$i$, and the output data signals therefrom are entered into memories 52 and 53, respectively. The address signals for the ROMs 50 and 51 are composed of the signal HB$i$ and the output C$i$ of the memory 52, and the signal HP$i$ and the output D$i$ of the memory 53. The memories 52 and 53 provide signals C$i$ and D$i$ representative of the scanned character in accordance with the HB$i$ and HP$i$ signals within the character region CHH, respectively. The signals C$i$ and D$i$ are fed to a recognition circuit 54, whose output D$_{out}$ indicates the recognition result.

Figure 13:
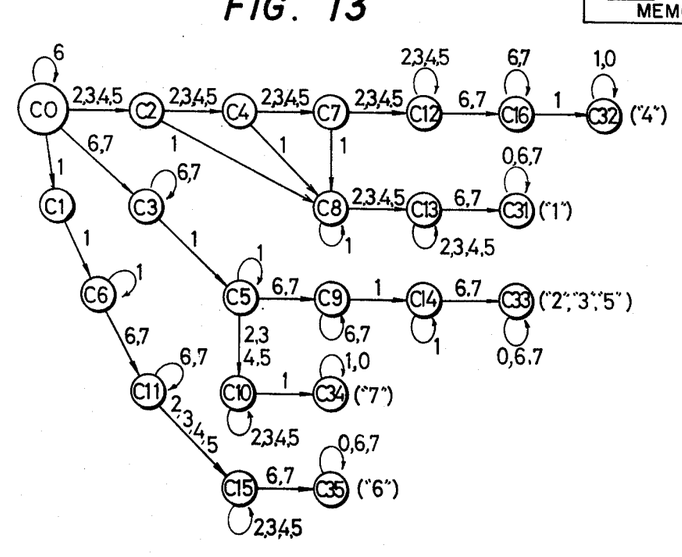
FIGS. 13 and 14 show flow diagrams of the operations of the character grouping portion.
Figure 14:
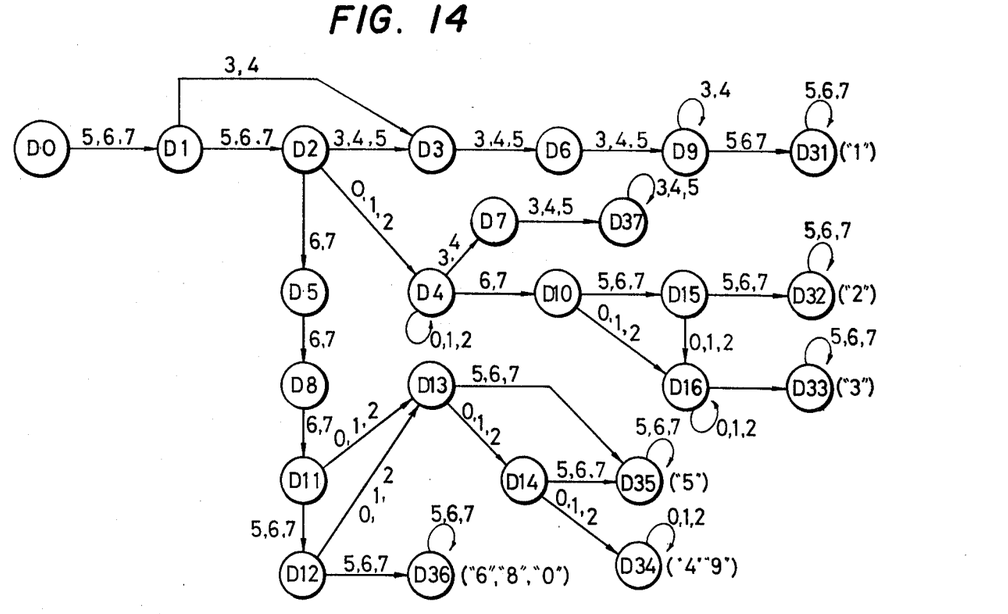

The logic flow diagram for the character group classifying circuit composed of the ROM 50 and the memory 52 is shown in FIG. 13, and that for the circuit composed of the ROM 51 and the memory 53 is shown in FIG. 14.

When the HB$i$ and HP$i$ data as shown in FIG. 7a is obtained, the outputs of the character group classifying circuit corresponding to FIG. 13 change in the order of C0, C2, C8, C13 and C31, wherein the character group C31 includes the character "1". The outputs of the circuit corresponding to FIG. 14 change in the order of D0, D1, D2, D3, D6, D9 and D31, wherein the character group D31 also includes the character "1". The recognition circuit 54 thus recognizes the character "1" from the character groups C31 and D31, and provides a recognition signal representative of the character "1".

Figures 15A, 15B:
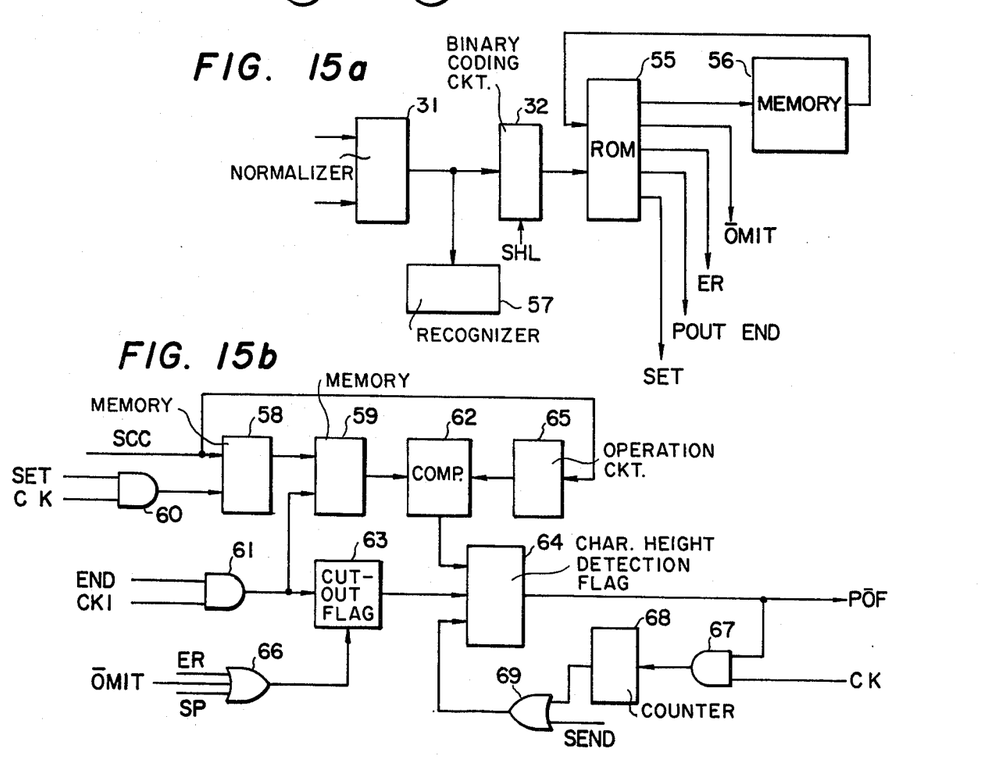
FIGS. 15(a) and 15(b) show modifications of the circuit of FIG. 2.
Figure 16:
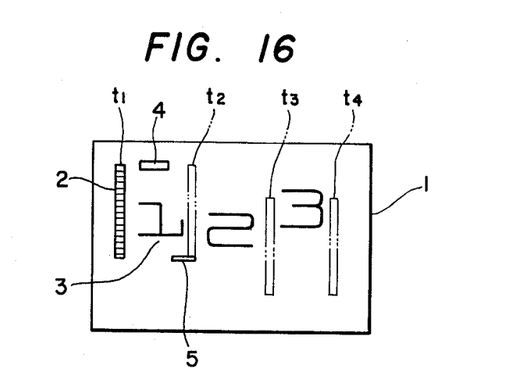
FIG. 16 is similar to FIG. 1, showing the effect of dirt spots and irregular character arrangement.
Figure 18:
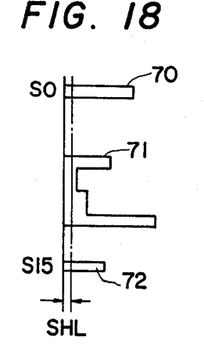
FIG. 18 shows another character segment occurrence frequency distribution.
Figure 19:
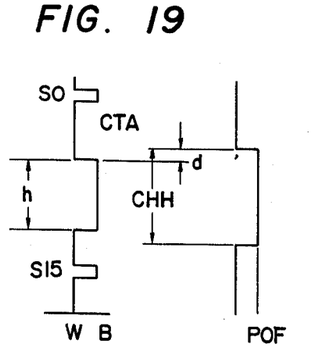
FIG. 19 shows a binary coding of the distribution in FIG. 18.

FIGS. 15a and 15b show different block circuit diagrams for "cutting out" the scanned character. The output of the normalizer 31 shown in FIG. 2 is supplied to the binary coding circuit 32 and a recognition circuit 57. The latter recognizes the scanned character according to the arrangement of the normalized data supplied thereto from the normalizer 31. In the coding circuit 32, the normalized data is compared with a predetermined constant threshold value SHL to classify the data into two binary coded values correspondng to a unit region occupied by a character segment and a unit region other than that occupied by a character segment, thereby to project the binary coded data pattern on a vertical axis upon completion of each vertical scan. For example, FIGS. 18 and 19 show the normalized data and the binary coded data patterns at position $t_2$, respectively, when the sensor array 2 is moved from position $t_1$ to position $t_2$, as shown in FIG. 16.

The normalized data for the character 3 consisting of numeral "1" and the dirt spots or stains 4 and 5 are shown at 71 and 70, 72, respectively. FIG. 19 shows the data pattern after binary-coding corresponding to the normalized data of FIG. 18, wherein the background and character regions are represented by W and B, respectively.

Reverting to FIG. 15a, a ROM 55 is supplied with the outputs of the binary coding circuits 32 and a memory 56. The data read out from ROM 55 is entered in the memory 56. The ROM 55 also generates signals SET, END, ER and OMIT as hereinunder described. The memory 56 is cleared in response to the vertical scan completion signal SEND.

Figure 17:
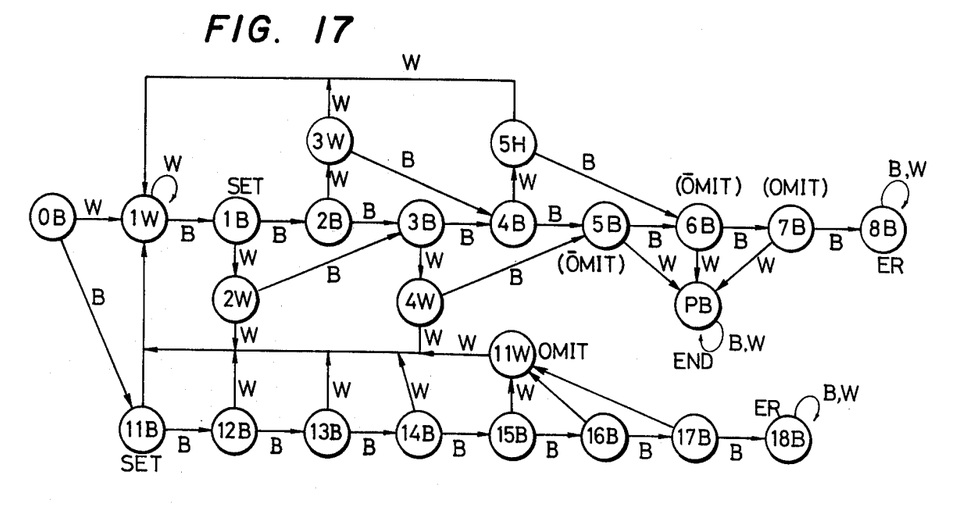
FIG. 17 shows a flow diagram of the operation of the recognition circuits of FIG. 15.

FIG. 17 shows a logic flow diagram for the readout signals of the ROM 55. In this figure, the numbered and lettered $n$B and $n$W (where $n$ is an integer or P) show the various states, and the $n$B and $n$W with arrows show the binary coded black and white signals. The SET, ER, END and OMIT designations show the output signals obtainable at the respective states. The (OMIT) indicates an OMIT signal generated at the completion of one vertical scan. The SET signal designates the initiation of the character "cut-out", the ER signal represents noise produced when a continuous line segment is longer than the character height, the END signal designates the end of the character cut-out, and the OMIT signal means that a portion of a character segment is out of the sensor field 2.

Assuming that a signal such as shown in FIG. 19 is supplied from the binary coding circuit 32, S0 and S15 represent the outputs from the cells at the upper most and lower most ends of the sensor field 2. If a series of binary coded signals B,W,W,W,W,W,B,B,B,B,B,B W,W,W,B are provided from the upper most cell toward the lower most cell, respectively, the logic flow in FIG. 17 is shifted in the order of OB, 11B, 1W, 1B, 2B, 3B, 4B, 5B, 6B and PB. In the 11B state, the SET signal is once provided, and is again produced in the 1B state. The END signal is produced in the state PB to indicate the completion of the character cut-out in the vertical direction.

Where the sensor is manipulated by hand or the vertical positions of the printed characters vary widely, causing a portion of a character segment to fall outside of the sensor field, there is a possibility of erroneous recognition, and such conditions should be detected.

Figure 20:
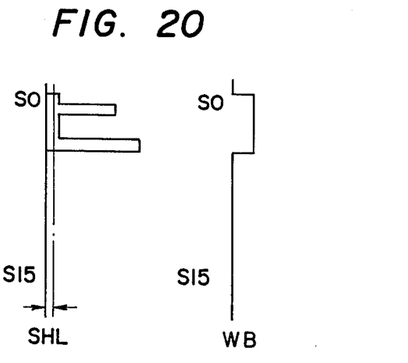
FIG. 20 shows the signals obtained when a character is out of the sensor field.

FIG. 20 shows the normalized and binary-coded data when the sensor field is moved from position $t_3$ to position $t_4$ shown in FIG. 16. If the coded signals are produced in the order of B,B,B,B,B, W,W,W,W,W,W,W,W,W,W, and W, then the logic flow is shifted in order of OB, 11B, 12B, 13B, 14B, 15B, 11W and 1W as shown in FIG. 17. In the 11W state, the OMIT signal is produced to indicate that part of the character lies above the upper end of the sensor field.

Further, if the SEND signal representing the completion of one vertical scan is provided in the states 5B, 6B and 7B in FIG. 17, then it is recognized that a portion of the character lies below the lower end of the sensor field, and the OMIT signal is thus produced.

The control and binary-coding circuit 16 may include a counter for discriminating that one of the vertically addressed unit regions which is being scanned during each vertical scan. The counter content SCC represents the address of the current scanning unit region.

In FIG. 15b, when the SET signal is supplied from the ROM 55 (FIG. 15a) to a memory 58, it causes the SCC address to be entered into the memory. Since the later signal is more prominant than the preceding signal for the binary coded data as shown in FIG. 19, the SCC address at that moment is entered again into the memory 58 upon the receipt of the second SET signal.

When the cutting-out of the character is completed and the state reaches PB, the latter state is held until the succeeding SEND signal arrives so that the END signal is continuously provided.

When one vertical scan is completed and the END signal has been produced, the content of memory 58 is entered into a memory 59 just before the SEND signal is produced, under the control of the clock pulse CK1. As a result, the memory 59 cuts out the character in the vertical direction and stores the address CTA of the upper most unit region.

The SET and END signals are applied to AND gates 60 and 61, respectively, and are ANDed with the clock signal CK produced for every unit region scan, and with the clock signal CK1 produced at the completion of each vertical scan, respectively. The outputs of the AND gates are entered into the memories 58 and 59, respectively. When the AND gate 61 provides a binary "1" output, a cutting-out flag 63 is set to indicate that the character has been vertically cut out.

When the noise signal ER, the signal OMIT indicating the protrusion of the character outside of the sensor field, or a space signal SP is produced, the cutting-out flag 63 is cleared by an OR gate 66, thereby indicating that the character has not been cut out. In the latter case, character recognition is not performed in order to avoid an erroneous recognition.

In order to provide a vertical tolerance above the cut-out area when one character scan completion is detected, an operation circuit 65 adds a constant value ($d$ in FIG. 19) to the address of the unit region and supplies the added value to a comparator 62. The latter compares the address CTA of the upper most unit region of the character cut out with the content of the operation circuit 65, and when the result shows an equality therebetween (note that the address of the upper most cell is made 0 and the lower the cell is the larger the address), it provides an output to a character height detection flag 64. The flag 64 is set to provide the POF signal when the cutting-out flag 63 is set and a signal is supplied from the comparator 62. A counter 68 counts the number of the clock signals CK starting at the generation of the POF signal and ending when the unit regions corresponding to the character height CHH (see FIG. 19) have been scanned. The character height flag 64, which provides an overflow signal when the number of counted clock pulses is made equal to the value CHH, is cleared by the output signal from an OR gate 69, which receives both the clock signals CK from the counter 68 and the SEND signal.

For example, in FIG. 19, assuming that the content of SCC in the vertical scan is $Sn$, since the character height $CHH = h + 2d$, the character area is defined if $Sn$ satisfies the following equation:

$$CTA + b + d \geq Sn \geq CTA - d$$

If $Sn$ satisfies the above formula, then the POF signal is generated.

The counter 68 is also cleared by the END signals.

The horizontal cutting-out of the character in this embodiment is the same as in the previous embodiment.

Although in these embodiments the character is recognized on the basis of the frequency distribution of the character segments projected on the vertical axis, and the segment distribution of the front side of the character, it is possible to recognize the character on the basis of the frequency distribution of the character segments projected on the vertical axis and the segment distribution of the rear side of the character, or by a combination of the front and rear segment distributions. The segment distribution of the rear side of the character may be obtained by detecting the disappearance of a character segment in each unit region; that is, counting the number of vertical scans starting at the time when the last character segment appears and ending when one character scan is completed.

According to the present invention, there is no need to memorize the character pattern as an electrical signal pattern, and therefore there is no need to employ a large capacity memory device, thereby resulting in a relatively compact and inexpensive character recognition system.

It is advisable to provide a suitable indicator for the scanning array 2 shown in FIG. 2, which is capable of selectively indicating the items being scanned to the user. It may be convenient for the operator if the scanning condition indications are directly available to him. That is, an indication of the scanning condition of a specific item being scanned may be indicated. When the item is scanned and read out erroneously, the indication corresponding to the item is continued, and when it is scanned correctly, the indication is removed and replaced by another indication corresponding to the next item to be scanned. The indicators may be in any form, such as a set of lamps, photoemissive elements, color producing devices, etc. Signals for selectively actuating the indicators may be derived from the outputs ER, OMIT, END, etc.

The flow diagrams shown in FIGS. 11, 13, 14 and 17 may be implemented, with substantially equal effect, by a number of specific logic circuit configurations whose design and assemblage are well within the skill of the ordinary artisan. No such detailed circuit configurations have been disclosed for this reason, and also because they form no part of the present invention.

While the invention has been described in detail and with reference to specific embodiments thereof, it will be apparent to one skilled in the art that various changes and modifications can be made therein without departing from the spirit and scope thereof.

What is claimed is:

1. A character recognition system, comprising: a scanner having an aligned, one dimensional array of photosensitive elements mounted thereon and grouped into a plurality of sections, each section including at least one of said photosensitive elements and forming a unit region, said scanner being adapted to be moved in a direction substantially normal to the direction of alignment of said array to thereby scan characters and/or symbols arranged in parallel with the scanning direction, first means responsive to an output of said scanner for counting the number of occurrences of character segments for each of said unit regions to obtain a segment occurrence frequency distribution in the direction of alignment of said array, second means responsive to an output of said scanner for counting the number of scans in the direction of alignment of said array for each of said unit regions, starting when the first and/or last character segment is detected and ending when one character scan is completed, to thereby obtain the front side and/or rear side shape of the character, and third means for recognizing the character according to the character segment occurrence frequency distribution and the front and/or rear shape of the character.

2. A character recognition system or claimed in claim 1, wherein said first means comprises means for normalizing the occurrence frequency distribution, and means for binary-coding the normalized occurrence frequency distribution by comparing it with a constant value, to thereby determine the character presence region in the direction of alignment of said array.

3. A character recognition system as claimed in claim 2, further comprising means responsive to said normalized and binary-coded occurrence frequency distribution for determining whether a portion of the character being scanned is out of the field of said array.

4. A character recognition system as claimed in claim 1, further comprising means responsive to the outputs of said photo-sensitive elements for determining the completion of one character scan when all of said elements no longer detect character segments.

5. A character recognition system as claimed in claim 4, further comprising means responsive to said normalized and binary-coded occurrence frequency distribution for determining whether a portion of the character being scanned is out of the field of said array.

6. A character recognition system is claimed in claim 1, further comprising fourth means for actuating said third means when the character presence region is determined after the maximum value of the occurrence frequency distribution reaches a predetermined constant level.

7. A character recognition system as claimed in claim 1, further comprising means responsive to the occurrence frequency distribution for determining whether a portion of the character being scanned is out of the field of said array.

8. A character recognition system as claimed in claim 1, wherein said scanner comprises means for sequentially storing the output signals of said elements in one vertical scan, means for providing the maximum value of said output signals, means for providing a threshold value as a function of the maximum value, and means for comparing the threshold value with the stored signals.

9. A character recognition system as claimed in claim 8, wherein said means for providing the maximum value includes an adder for adding the output signals of each set of N successive elements when the scanning of said elements is performed with an N phase clock signal to detect the maximum value of the added signals, the maximum value being used for providing the threshold value.

10. A character recognition system as claimed in claim 8, wherein the maximum value is detected from a center region of the sequentially stored output signals of said elements.

11. A character recognition system as claimed in claim 1, wherein said scanner comprises means for sequentially storing the output signals of said elements in one vertical scan, means for providing the minimum value of said output signals, means for providing a threshold value as a function of the minimum value, and means for comparing the threshold value with the stored signals.

12. A character recognition system as claimed in claim 11, wherein said means for providing the minimum value includes an adder for adding the output signals of each set of N successive elements when the scanning of said elements is performed with an N phase clock signal to detect the minimum value of the added signals, the minimum value being used for providing the threshold value.

13. A character recognition system as claimed in claim 11, wherein the minimum value is detected from a center region of the sequentially stored output signals of said elements.

14. A character recognition system, comprising: a scanner having an aligned, one dimensional array of photo-sensitive elements mounted thereon and adapted to scan characters and/or symbols arranged in a direction normal to the direction of alignment of said array, said elements being divided into a plurality of groups each containing at least one of said elements, and each group defining a unit region, first means responsive to an output of said scanner for counting the number of character segment occurrences for each unit region to detect the maximum value of the character segment occurrence frequency distribution, second means responsive to the maximum value of the occurrence frequency distribution and the counts for the respective unit regions to obtain ratios therebetween, to thereby normalize the occurrence frequency distribution, third means responsive to an output of said scanner for counting the number of scans for each unit region starting when the first and/or last character segment is detected and ending when one character scan is completed, to thereby detect the maximum value of the front and/or rear data shape of the character, fourth means responsive to the maximum value and the counts for said respective unit regions for obtaining ratios therebetween to thereby normalize the front and/or rear data shape, and fifth means responsive to the normalized data shape and the normalized occurrence frequency distribution for recognizing the scanned character therefrom.

15. A character recognition system as claimed in claim 14, wherein the maximum value of the occurrence frequency distribution is detected from the character presence range.

16. A character recognition system as claimed in claim 14, wherein said maximum value of the front and/or rear data shape of the character is detected from the character presence range.

17. A character recognition system as claimed in claim 14, wherein said first means compares the normalized occurrence frequency distribution with a constant value to binary-code the normalized occurrence frequency distribution, to thereby determine the character presence region in the direction of alignment of said array.

18. A character recognition system as claimed in claim 14, wherein a first character group and a second character group are selected from said character segment occurrence frequency distribution and the front and/or rear shape of the character, and the character is recognized on the basis of said first and second character groups.

19. A character recognition system as claimed in claim 14, further comprising means responsive to the occurrence frequency distribution for determining whether a portion of the character being scanned is out of the field of said array.

20. A character recognition system as claimed in claim 14, wherein said scanner comprises means for sequentially storing the output signals of said elements in one vertical scan, means for providing the maximum value of said output signals, means for providing a threshold value as a function of the maximum value, and means for comparing the threshold value with the stored signals.

21. A character recognition system as claimed in claim 20, wherein said means for providing the maximum value includes an adder for adding the output signals of each set of N successive elements when the scanning of said elements is performed with an N phase clock signal to detect the maximum value of the added signals, the maximum value being used for providing the threshold value.

22. A character recognition system as claimed in claim 20, wherein the maximum value is detected from a center region of the sequentially stored output signals of said elements.

23. A character recognition system as claimed in claim 14, wherein said scanner comprises means for sequentially storing the output signals of said elements in one vertical scan, means for providing the minimum value of said output signals, means for providing a threshold value as a function of the minimum value, and means for comparing the threshold value with the stored signals.

24. A character recognition system as claimed in claim 23, wherein said means for providing the minimum value includes an adder for adding the output signals of each set of N successive elements when the scanning of said elements is performed with an N phase clock signal to detect the minimum value of the added signals, the minimum value being used for providing the threshold value.

25. A character recognition system as claimed in claim 23, wherein the minimum 25. is detected from a center region of the sequentially stored output signals of said elements.

26. A character recognition system, comprising: a scanner having an aligned, one dimensional array of photosensitive elements and adapted to scan characters and/or symbols arranged in a direction normal to the direction of alignment of said array, said elements being divided into a plurality of groups each containing at least one of said elements, and each group defining a unit region, first means responsive to an output of said scanner for counting the number of character segment occurrences for each unit region to obtain a character segment occurrence frequency distribution in the direction of alignment of said array, second means responsive to an output of said scanner for counting the number of scans of each unit region from the time when a segment first appears in the unit region to the time at which one character scan is completed, to thereby obtain the front shape of the character, third means responsive to the character segment occurrence frequency distribution and the data obtained from a plurality of successive unit regions of the front shape for deriving partial features therefrom, and fourth means for recognizing the character from the arrangement of the partial features.

27. A character recognition system as claimed in claim 26, wherein said first means further includes means for normalizing the character segment occurrence frequency distribution, said second means includes means for normalizing the front shape of the character, and said third means responds to the normalized segment occurrence frequency distribution and the normalized front data shape to derive the partial features.

28. A character recognition system as claimed in claim 26, wherein a first character group and a second character group are selected from said character segment occurrence frequency distribution and the front and/or rear shape of the character, and the character is recognized on the basis of said first and second character groups.

29. A character recognition system as claimed in claim 28, wherein the recognition of the character is performed when the character is contained in both of the first and second character groups.

30. A character recognition system as claimed in claim 26, further comprising means responsive to the occurrence frequency distribution for determining whether a portion of the character being scanned is out of the field of said array.

31. A character recognition system as claimed in claim 26, wherein said scanner comprises means for sequentially storing the output signals of said elements in one vertical scan, means for providing the maximum value of said output signals, means for providing a threshold value as a function of the maximum value, and means for comparing the threshold value with the stored signals.

32. A character recognition system as claimed in claim 31, wherein said means for providing the maximum value includes an adder for adding the output signals of each set of N successive elements when the scanning of said elements is performed with an N phase clock signal to detect the maximum value of the added signals, the maximum value being used for providing the threshold value.

33. A character recognition system as claimed in claim 31, wherein the maximum value is detected from a center region of the sequentially stored output signals of said elements.

34. A character recognition system as claimed in claim 26, wherein said scanner comprises means for sequentially storing the output signals of said elements in one vertical scan, means for providing the minimum value of said output signals, means for providing a threshold value as a function of the minimum value, and means for comparing the threshold value with the stored signals.

35. A character recognition system as claimed in claim 34, wherein the minimum value is detected from a center region of the sequentially stored output signals of said elements.

* * * * *